(No Model.)

G. MARTIN.
CULTIVATOR.

No. 254,776. Patented Mar. 7, 1882.

Attest
Geo. T. Smallwood Jr.
L. M. Hopkins

Inventor
Gabriel Martin
By Knight Bros
attys (No Model.) 2 Sheets—Sheet 2.

G. MARTIN.
CULTIVATOR.

No. 254,776. Patented Mar. 7, 1882.

Attest:
Geo. T. Smallwood Jr.
L. M. Hopkins

Inventor:
Gabriel Martin
By Knight Bros.
Atty's

UNITED STATES PATENT OFFICE.

GABRIEL MARTIN, OF MONROE TOWNSHIP, LOGAN COUNTY, OHIO.

CULTIVATOR.

SPECIFICATION forming part of Letters Patent No. 254,776, dated March 7, 1882.

Application filed July 16, 1881. (No model.)

*To all whom it may concern:*

Be it known that I, GABRIEL MARTIN, a citizen of the United States, residing at Monroe township, in the county of Logan and State of Ohio, have invented an Improvement in Cultivators, of which the following is a specification.

My invention particularly relates to those cultivators adapted for straddling a row of corn; and it consists in providing such a cultivator with supplemental and independent shovels for stirring the ground between the rows, said supplemental shovels working outside of the central straddling shovels, and being held down by a spring mechanism, which adapts them to yield to immovable obstructions, the pressure of the springs being varied by adjusting levers so as to regulate the depth of penetration of the supplemental shovels.

Figure 1:
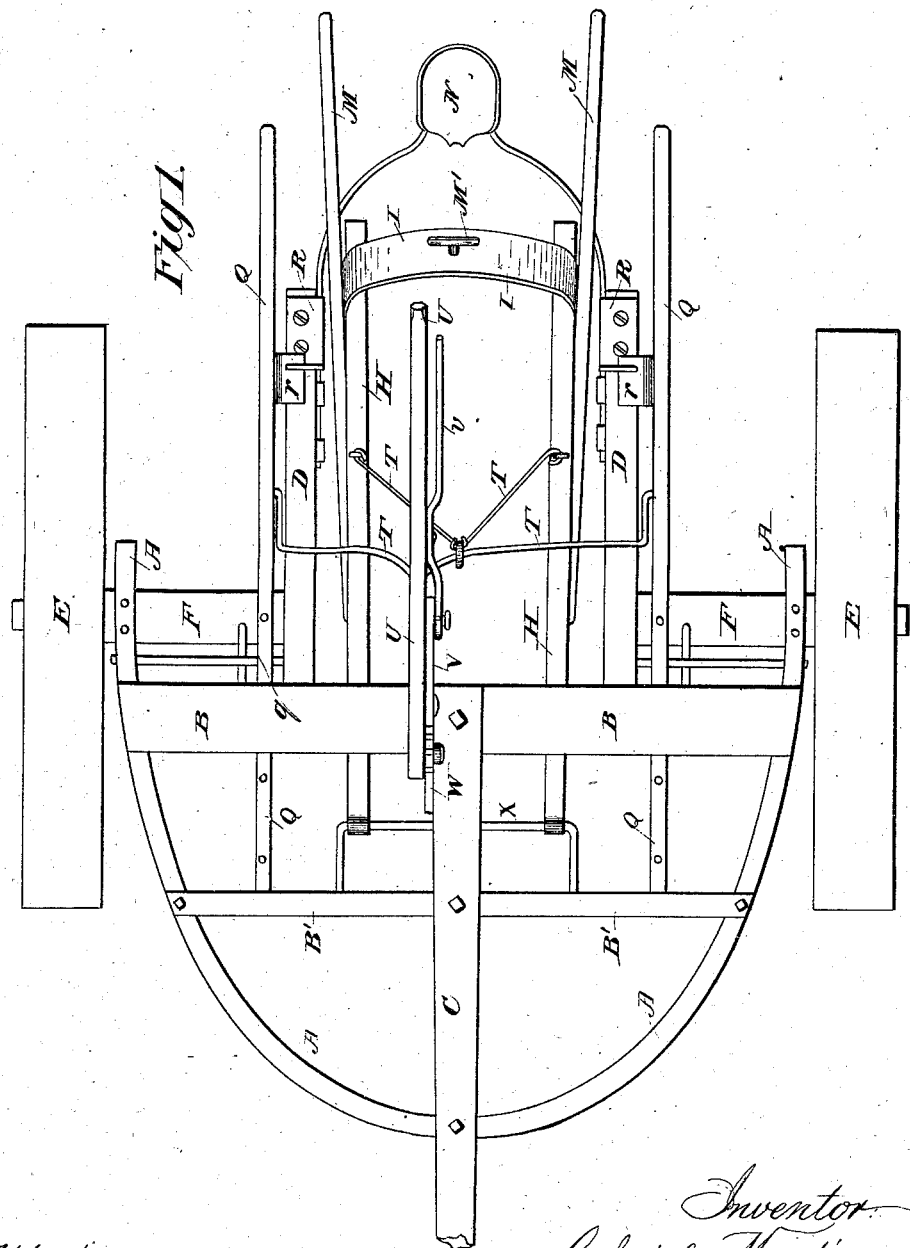
Figure 2:
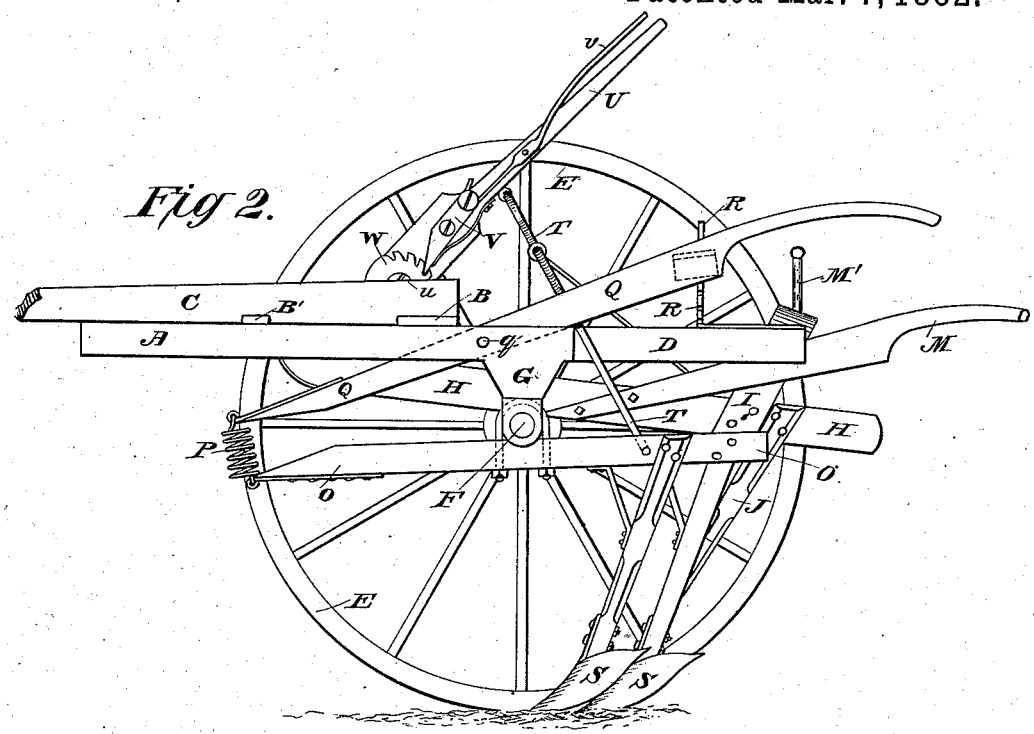
Figure 3:
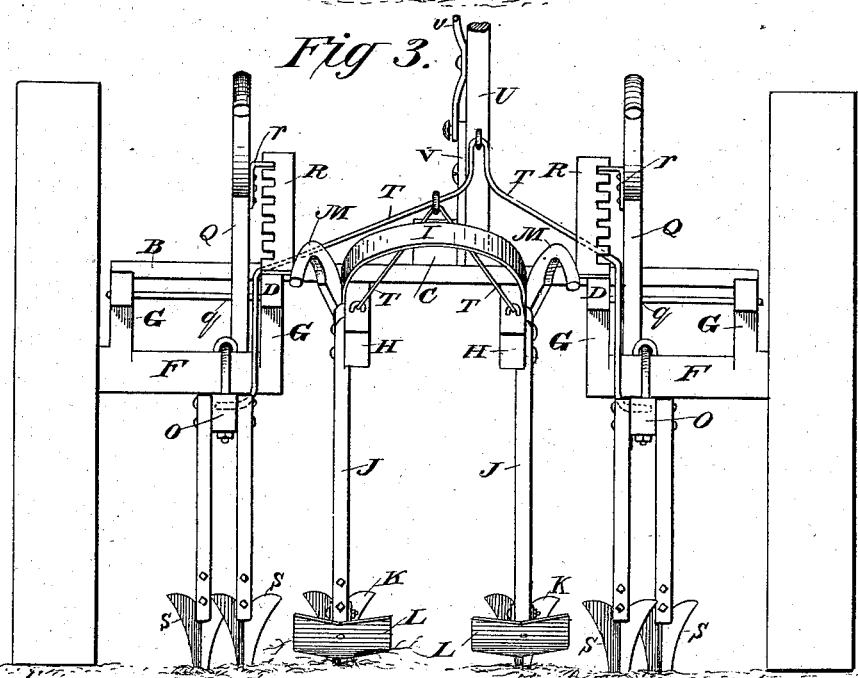

In the accompanying drawings, Figure 1 is a plan view of the implement with the supplemental beams and shovels removed. Fig. 2 is a side view thereof with one wheel removed, and showing the supplemental shovels attached. Fig. 3 is a rear view.

A represents a bent axle or frame, to which two bolsters, B B', are firmly bolted, and to this the tongue C is fixed. Stationary beams D D extend backward from the bolster B, being fixed thereto at points about midway between its center and ends. The wheels E E run on spindles F F, attached through the medium of pillow-blocks G G to the fixed beams D and the extremities of the bent axle A. The beams H H of the middle plows are jointed in front to the horizontal rod X, which is rigidly attached to the forward bolster, B'. The beams H H are connected near their rear ends by a rigid yoke, I, adapted to straddle the row of corn.

Near the rear ends of the beams H H are attached plow-standards J J, provided with shovels K K, and on the rear sides of said standards are attached cutting-blades L L, employed for severing vines of pease, weeds, &c., which obstruct cultivation.

The handles for use in walking are shown at M M attached in front to the beams H H, and braced by connection with the yoke I. When the implement is used for riding, these handles are removed and a central handle fixed to the summit of the yoke I, as shown at M'.

The seat for riding is shown at N.

O O are the supplemental plow-beams, hinged to the spindles F between the pillow-blocks G G, and held down to their work by springs P P, attached to the forward ends of the beams O and to the forward ends of levers Q, which are fulcrumed at q in the stationary frame, and provided with pawls or plates r, engaging in toothed racks R, projecting upward from the fixed beams D, so that by depressing the rear ends of the said levers Q the supplemental shovels, which are shown at S, may be made to penetrate to a greater depth, or by raising the rear ends of said levers may be made to work shallower.

The springs P render the supplemental cultivators automatic in their action, permitting them to yield so as to pass immovable obstructions without injury and to resume their operative position.

The cultivators are connected by chains or rods T to a lever, U, common to all, fulcrumed at u, and provided with a spring-catch, V, engaging with a segment-rack, W, and operated by a thumb-lever, v, so that all of the cultivators may be raised simultaneously out of operative position when the implement is to be turned at the end of a row or to be moved from place to place.

I am aware that it is not broadly new to use a spring controlled by a lever for applying adjustable pressure to the drag of a grain-drill, and that springs have also been used to apply a yielding pressure to cultivator-beams.

Having thus described my invention, the following is what I claim as new therein and desire to secure by Letters Patent:

In a cultivator adapted for straddling the row of corn, the combination of supplemental cultivators O S, hinged near their centers to the axle, springs P at the forward end of the beams of said cultivators, handles or levers Q, extending from said springs to the rear of the cultivator, and racks R, all arranged substantially as and for the purposes set forth.

GABRIEL MARTIN.

Witnesses:
C. D. CAMPBELL,
GUY HUMPHREY.